(12) United States Patent
Ito et al.

(10) Patent No.: US 8,532,525 B2
(45) Date of Patent: Sep. 10, 2013

(54) IMAGE-FORMING APPARATUS

(75) Inventors: Sakae Ito, Kitanagoya (JP); Takuro Kusama, Nagoya (JP); Satoru Hattori, Nagoya (JP)

(73) Assignee: Brother Kogyo Kabushiki Kaisha, Nagoya-shi (JP)

(*) Notice: Subject to any disclaimer, the term of this patent is extended or adjusted under 35 U.S.C. 154(b) by 75 days.

(21) Appl. No.: 13/338,300

(22) Filed: Dec. 28, 2011

(65) Prior Publication Data
US 2012/0099891 A1    Apr. 26, 2012

Related U.S. Application Data

(63) Continuation of application No. 11/875,094, filed on Oct. 19, 2007, now Pat. No. 8,099,016.

(30) Foreign Application Priority Data

Oct. 25, 2006 (JP) ................................. 2006-290396

(51) Int. Cl.
G03G 15/00     (2006.01)

(52) U.S. Cl.
USPC ............................. 399/107; D18/50; 399/125

(58) Field of Classification Search
USPC .................. 399/107, 110, 124, 125; D18/50
See application file for complete search history.

(56) References Cited

U.S. PATENT DOCUMENTS

| | | | |
|---|---|---|---|
| 6,057,936 A | 5/2000 | Obara et al. | |
| 6,741,820 B2 * | 5/2004 | Nobe et al. | 399/110 |
| 7,463,860 B2 | 12/2008 | Nobe et al. | |
| 7,675,536 B2 | 3/2010 | Palumbo et al. | |
| 8,155,556 B2 * | 4/2012 | Moribe et al. | 399/107 |
| 2006/0088336 A1 | 4/2006 | Hirose et al. | |

FOREIGN PATENT DOCUMENTS

| | | |
|---|---|---|
| JP | 10-301349 A | 11/1998 |
| JP | 11-160941 A2 | 6/1999 |
| JP | 11-199120 A2 | 7/1999 |
| JP | 2004-233490 A2 | 8/2004 |
| JP | 2005-165361 A2 | 6/2005 |
| JP | 2006-065188 A2 | 3/2006 |
| JP | 2006-119474 A2 | 5/2006 |
| JP | 2006-126406 A2 | 5/2006 |

OTHER PUBLICATIONS

Cannon "PIXUS iP8600"; http://cweb.canon.jp/newsrelease/2004-09/pr-pixus.html.

* cited by examiner

*Primary Examiner* — Hoang Ngo
(74) *Attorney, Agent, or Firm* — Banner & Witcoff, Ltd.

(57) ABSTRACT

An image scanner section is disposed above a printer section. The image scanner section is supported by the printer section in such a manner as to be pivotable about a pivotal axis. The printer section has a lower housing having a substantially rectangular shape as viewed from above. The image scanner section has an upper housing having a substantially rectangular shape as viewed from above. The upper housing and the lower housing are configured such that a second upper corner portion, which is a corner portion of the upper housing, projects beyond a second lower corner portion, which is a corner portion of the lower housing and is located just under the second upper corner portion.

6 Claims, 8 Drawing Sheets

IMAGE-FORMING APPARATUS

CROSS-REFERENCE TO RELATED APPLICATION

This application is a continuation to U.S. application Ser. No. 11/875,094 dated Oct. 19, 2007 and claims priority from Japanese Patent Application No. 2006-290396, filed on Oct. 25, 2006, the disclosures of these applications are herein incorporated by reference in their entirety.

BACKGROUND OF THE INVENTION

1. Field of the Invention

The present invention relates to an image-forming apparatus.

2. Description of the Related Art

Conventionally, there is known an image-forming apparatus having an image-forming section, an image-reading section provided above the image-forming section, and a catch tray provided therebetween. The image-reading section has a function of reading a document image. The image-forming section has a function of forming an image on paper.

Conventionally, there is also known the thus-configured image-forming apparatus in which the image-reading section is pivotable about a predetermined pivotal axis (disclosed in, for example, Japanese Patent Application Laid-Open (kokai) Nos. 10-301349, 2005-165361, 2006-65188, 2006-119474, and 2006-126406). In this kind of image-forming apparatus, pivoting the image-reading section upward opens the catch tray widely toward the exterior of the apparatus. This facilitates, for example, takeout of paper on which an image is formed.

As disclosed in Japanese Patent Application Laid-Open (kokai) Nos. 10-301349, 2005-165361, and 2006-126406, in the image-forming apparatus in which the catch tray opens widely laterally (in a direction perpendicular to the opening/closing direction of the image-reading section; i.e., in a direction along the pivotal axis), an operation of opening/closing the image-reading section is easy. However, such a configuration may involve unstable support of the image-reading section, potentially resulting in failure in image-reading operation.

Meanwhile, as disclosed in Japanese Patent Application Laid-Open (kokai) Nos. 2006-65188 and 2006-119474, in the image-forming apparatus in which the catch tray opens only frontward (in a direction along the opening/closing direction of the image-reading section; i.e., in a direction perpendicular to the pivotal axis), the image-reading section is stably supported. However, such a configuration renders difficult an operation of opening/closing the image-reading section.

SUMMARY OF THE INVENTION

An object of the present invention is to provide an image-forming apparatus configured such that an image-reading section can be easily opened/closed while being stably supported.

An image-forming apparatus of the present invention comprises an image-forming section and an image-reading section.

The image-forming section has a lower housing. The lower housing is a box-like member having a substantially rectangular shape as viewed from above. A paper ejection port and a catch tray are provided at an upper portion of the lower housing.

The image-reading section has an upper housing. The upper housing has a substantially rectangular shape as viewed from above. The upper housing is disposed above the image-forming section in such a manner as to cover the catch tray from above. The upper housing is supported by the lower housing in such a manner as to be pivotable about a pivotal axis located in the vicinity of an edge of the lower housing resembling a rectangular parallelepiped.

The present invention is characterized in that the upper housing and the lower housing are configured such that an upper corner portion and a corresponding lower corner portion differ in shape so as to allow the upper corner portion to project beyond the lower corner portion. The upper corner portion is a corner portion of the upper housing located on a free-end side of the upper housing apart from the pivotal axis. The lower corner portion is a corner portion of the lower housing located just under the upper corner portion.

In the above-mentioned configuration, the upper corner portion and the lower corner portion define an overhang such that the upper corner portion projects beyond the lower corner portion.

The lower corner portion may differ in shape from the upper corner portion along the entire height of the lower corner portion. The lower corner portion may have a recess.

In the thus-configured image-forming apparatus of the present invention, the image-reading section is pivoted upward about the pivotal axis (opening operation). The opening operation opens the catch tray widely toward the exterior of the image-forming apparatus. Subsequently, the image-reading section is pivoted downward about the pivotal axis (closing operation).

A user lifts up and down the upper corner portion of the upper housing in the image-reading section, thereby performing the opening operation and the closing operation. Since the upper corner portion projects beyond the lower corner portion of the lower housing in the image-forming section, when the user is to perform the opening/closing operation, the user can easily hook his/her hand onto the upper corner portion projecting beyond the lower corner portion.

According to this configuration, even though the catch tray does not open widely laterally (in a direction perpendicular to the opening/closing direction of the image-reading section; i.e., in a direction along the pivotal axis), the image-reading section can be easily opened/closed. Therefore, according to this configuration, the image-reading section can be easily opened/closed while being stably supported by the image-forming section (the lower housing).

The image-reading section has an image pickup unit. The image-reading section can be configured such that the image pickup unit can read an image at a predetermined read position. Also, the image-reading section can be configured such that the image pickup unit can read an image through movement in a predetermined direction. In this case, when an image-reading operation is not performed, the image pickup unit can be positioned at a predetermined base position. The base position may differ from or coincide with the read position.

For example, the image-reading section can be configured such that the base position or the read position is located toward the upper corner portion projecting beyond the lower corner portion. In this case, the image pickup unit can be configured such that its longitudinal direction is substantially perpendicular to the pivotal axis. The image-reading section can be configured such that the image pickup unit can read an image through movement toward another upper corner portion opposite the upper corner portion projecting beyond the lower corner portion.

According to this configuration, when an image-reading operation is not performed, the opening/closing operation is performed. At this time, the image pickup unit is positioned at a position located toward the upper corner portion which is lifted by the hand of the user. That is, when the opening/closing operation is performed, the hand of the user lifts a portion of the image-reading section in the vicinity of which the image pickup unit, which has a relatively heavy weight, is positioned.

Thus, in the course of the opening/closing operation, twisting of the image-reading section (the upper housing) can be effectively restrained. Therefore, the opening/closing operation can be performed more favorably.

Alternatively, for example, the image-reading section can be configured such that the base position or the read position is located toward the pivotal axis. In this case, the image pickup unit can be configured such that its longitudinal direction is along the pivotal axis. The image-reading section can be configured such that the image pickup unit can read an image through movement toward the free-end side of the image-reading section.

According to this configuration, when an image-reading operation is not performed, the opening/closing operation is performed. At this time, a portion of the image-reading section where the image pickup unit, which has a relatively heavy weight, is positioned is located toward the pivotal axis. Therefore, the user can lift the upper corner portion, which is located away from the portion where the image pickup unit is positioned, with a small force.

Thus, the opening/closing operation can be performed with a small force. Therefore, the opening/closing operation can be performed more favorably.

The image-forming apparatus may be configured as follows: the lower housing has a first side support portion and a second side support portion; the first side support portion is located on a side of the lower housing corresponding to one end of the pivotal axis; the first side support portion supports the upper housing from underneath; the second side support portion is located on a side of the lower housing corresponding to the other end of the pivotal axis; the second side support portion supports the upper housing from underneath; the lower corner portion is provided at a position corresponding to the first side support portion or the second side support portion; and an end face of the first or second side support portion adjacent to the lower corner portion is located at a position which is offset from the lower corner portion toward the pivotal axis.

According to this configuration, the image-reading section is supported from underneath by the first and second side support portions of the lower housing in the image-forming section. The catch tray can be formed between the first side support portion and the second side support portion.

In a region between the lower corner portion, and the upper corner portion projecting beyond the lower corner portion, the end face of the first or second side support portion is indented toward the pivotal axis. This establishes a state in which the upper corner portion projects to a greater extent. This further facilitates the opening/closing operation which utilizes the upper corner portion. Also, the visibility of the interior of the catch tray can be improved.

Preferably, the paper ejection port is located toward the pivotal axis. This can minimize the area of the image-forming apparatus projected on a plane.

A display portion may be provided on the lower corner portion. This can improve visibility of various indications corresponding to operating conditions of the image-forming apparatus.

Preferably, the lower corner portion is provided only at a position corresponding to the second side support portion. That is, preferably, an overhang defined by the upper corner portion and the lower corner portion such that the upper corner portion projects beyond the lower corner portion is provided only at a position corresponding to the second side support portion, and not at a position corresponding to the first side support portion.

According to this configuration, an end portion of the first side support portion located away from the pivotal axis supports a first upper corner portion from underneath. The first upper corner portion is a corner portion of the upper housing which is located on a free-end side of the upper housing apart from the pivotal axis. A first lower corner portion is a corner portion of the lower housing which is located just under the first upper corner portion. The first lower corner portion is provided continuously with the end portion of the first side support portion. A second upper corner portion is a corner portion of the upper housing located on the free-end side of the upper housing and projects beyond a second lower corner portion, which is a corner portion of the lower housing located just under the second upper corner portion.

According to this configuration, the first side support portion supports a portion of the upper housing which corresponds to the first side support portion and which ranges from a portion in the vicinity of the pivotal axis to the first upper corner portion. On a side of the upper housing corresponding to the second side support portion, the second upper corner portion projects beyond the second lower corner portion.

Thus, the image-reading section can be readily opened/closed through utilization of the second upper corner portion corresponding to the second side support portion and can be stably supported.

DESCRIPTION OF THE PREFERRED EMBODIMENT

An embodiment of the present invention (the best mode contemplated at the time of filing the present application) will next be described in detail with reference to the drawings.
<Overall Configuration of Multifunction Printer>

Figure 1:
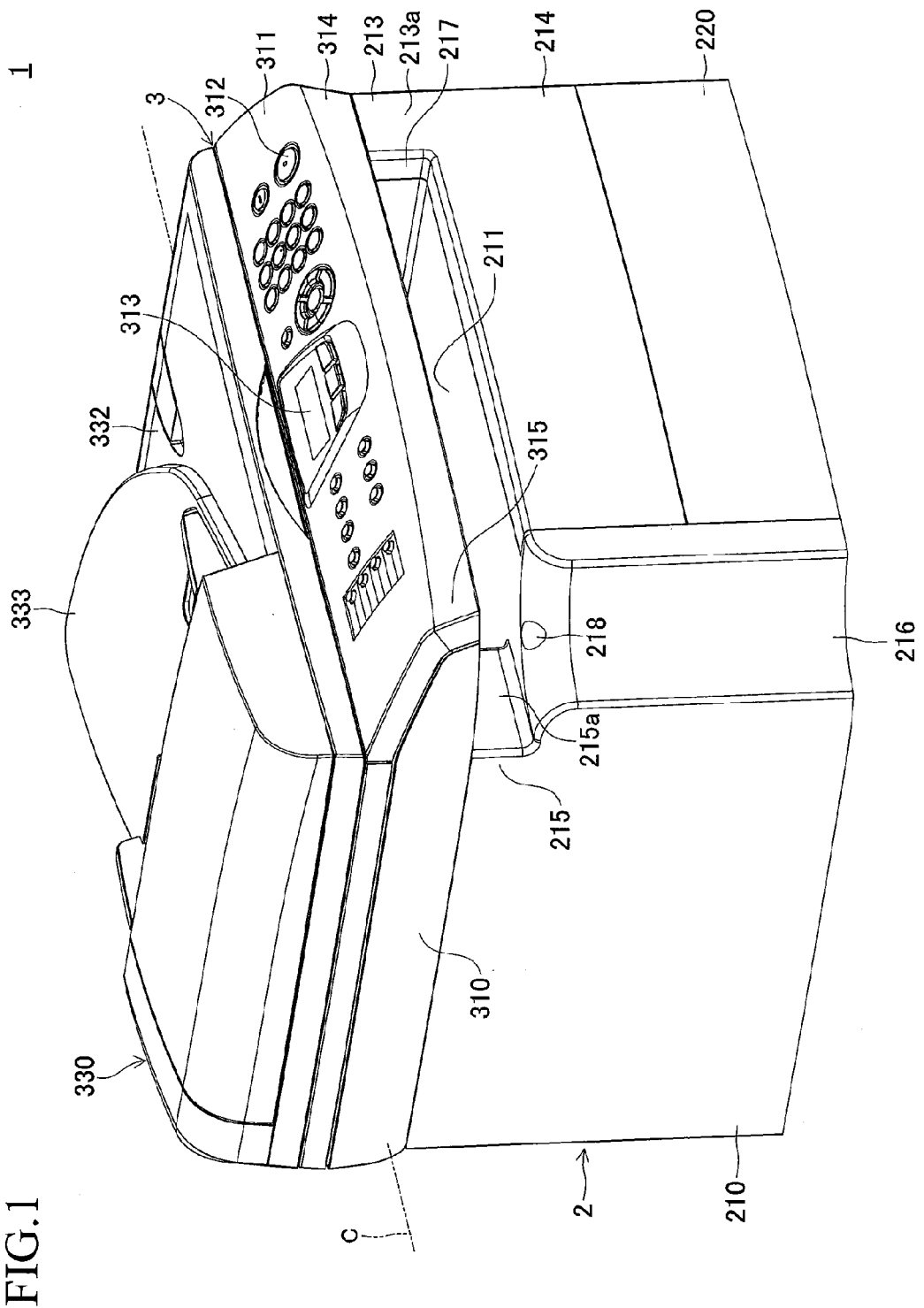
FIG. 1 is a perspective view of a multifunction printer which is an embodiment of an image-forming apparatus according to the present invention.

FIG. 1 is a perspective view of a multifunction printer 1 which is an embodiment of an image-forming apparatus according to the present invention. The multifunction printer 1 can read an image formed on a sheet of recording medium of up to A4 size (210 mm width×297 mm length). Also, the multifunction printer 1 can form an image on a sheet of recording medium of up to A4 size.

Referring to FIG. 1, the multifunction printer 1 includes a printer section 2, which serves as the image-forming section of the present invention, and an image scanner section 3, which serves as the image-reading section of the present invention. The image scanner section 3 is disposed above the printer section 2.

Figure 2:
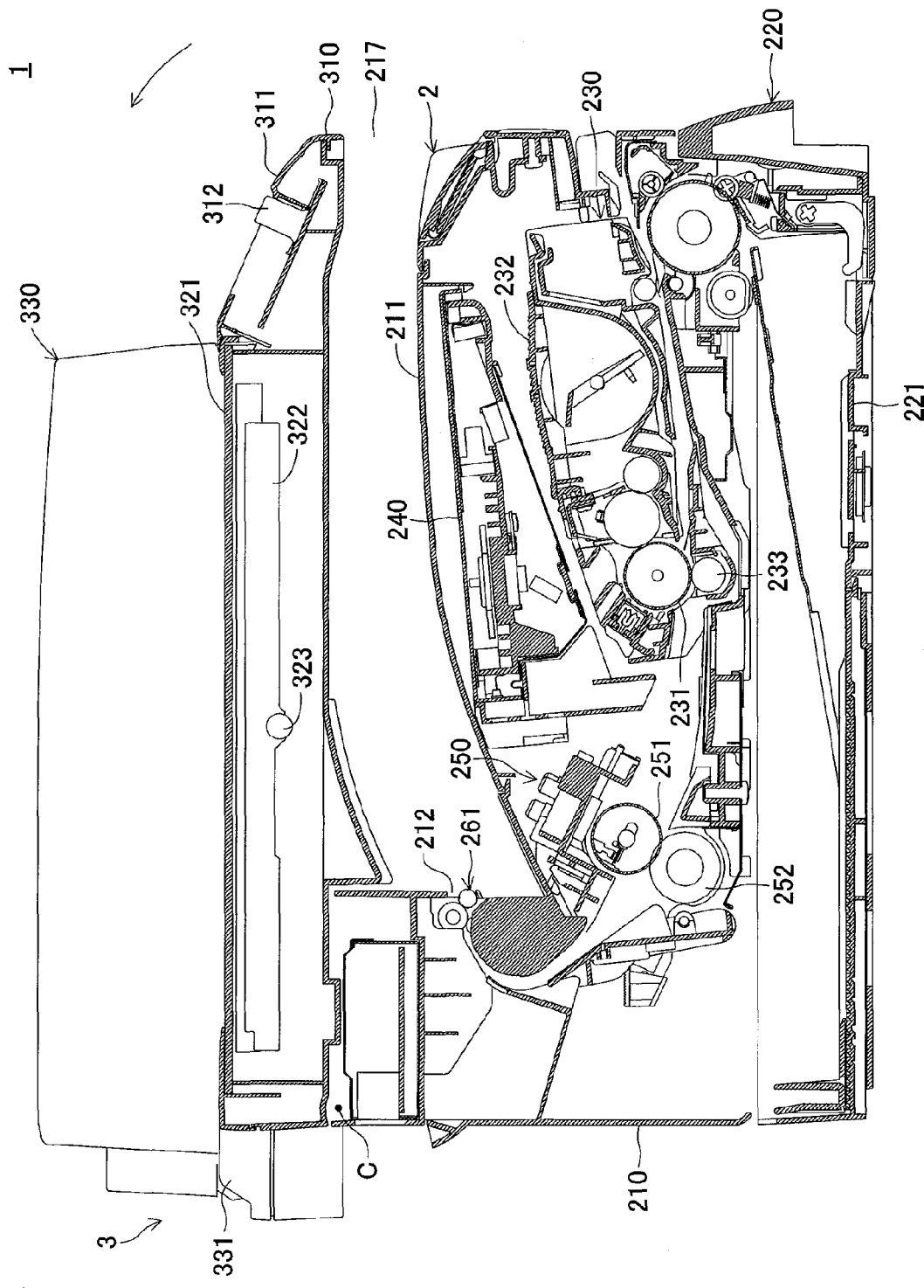
FIG. 2 is a left side sectional view of a printer section and a lower portion of an image scanner section shown in FIG. 1.

FIG. 2 is a sectional view of the printer section 2 and a lower portion of the image scanner section 3 of FIG. 1 as viewed from the left side. Referring to FIGS. 1 and 2, the image scanner section 3 is supported from underneath by the printer section 2 and is pivotable about a pivotal axis C in parallel with the width direction of the multifunction printer 1 such that a free end portion (a near end portion) of the image scanner section 3 can move pivotally up and down. That is, the multifunction printer 1 is configured such that the image scanner section 3 can be opened from a state shown in FIG. 2 in the direction of the arrow in FIG. 2.

The specific configuration of the printer section 2 and the image scanner section 3 in the present embodiment will next be described.

<Printer Section>

Referring to FIGS. 1 and 2, the printer section 2 has a lower housing 210. The lower housing 210 is a member for forming the housing of the printer section 2. The lower housing 210 is formed from a synthetic resin plate and assumes a box-like form having a substantially rectangular shape as viewed from above.

Referring to FIG. 2, a catch tray 211 is provided at an upper portion of the lower housing 210. The upper surface (which faces the image scanner section 3) of the lower housing 210 serves as the catch tray 211.

The catch tray 211 is a slope which extends downward from the near side (the right side in FIG. 2) to the far side (the left side in FIG. 2). In other words, an upper portion of the lower housing 210 has a recess which opens upward, and the bottom surface of the recess serves as the catch tray 211.

The catch tray 211 has a width corresponding to the width of a recording medium of A4 size (paper width: 210 mm). The catch tray 211 has such a length that a recording medium of A4 size can be placed thereon, without risk of dropping, with the longitudinal direction of the recording medium coinciding with the front-rear direction of the printer section 2.

The lower housing 210 has a paper ejection port 212 formed at an upper portion thereof. The paper ejection port 212 is a slit-like opening whose longitudinal direction is along the width direction of the multifunction printer 1. The paper ejection port 212 is located above a far end portion (a lowest portion) of the catch tray 211. That is, the paper ejection port 212 is located on the far side with respect to the center along the front-rear direction of the lower housing 210. The paper ejection port 212 is located toward the pivotal axis C.

<<Detailed Configuration of Lower Housing>>

Referring to FIG. 1, the lower housing 210 has a first side support portion 213 provided on a side of the lower housing 210 corresponding to one end of the pivotal axis C. The first side support portion 213 projects upward from the catch tray 211. The first side support portion 213 can support, from underneath, a portion of the image scanner section 3 (an upper housing 310 to be described later) corresponding to the one end of the pivotal axis C.

A first front end face 213a, which is an end face of the first side support portion 213 located on the near side (the far side from the pivotal axis C), is provided continuously with a first lower corner portion 214 located underneath. The first lower corner portion 214 is a corner portion of the lower housing 210 which is located on the near side and on a side corresponding to the one end of the pivotal axis C. The first front end face 213a is provided continuously with the front end face of the first lower corner portion 214 which partially constitutes the near end face of the lower housing 210.

The lower housing 210 has a second side support portion 215 provided on a side of the lower housing 210 corresponding to the other end of the pivotal axis C. The second side support portion 215 projects upward from the catch tray 211. The second side support portion 215 can support, from underneath, a portion of the image scanner section 3 (the upper housing 310 to be described later) corresponding to the other end of the pivotal axis C.

A second front end face 215a, which is an end face of the second side support portion 215 located on the near side (the far side from the pivotal axis C), is located at a position which is offset from the first front end face 213a toward the pivotal axis C. That is, the second front end face 215a is located at a position which is offset from the near end face of the lower housing 210 toward the pivotal axis C. The amount of offset is a minimum amount where a standard user can easily hook his/her hand onto a corner portion of the image scanner section 3. Specifically, the amount of offset corresponds to the length between the tip and the first joint of the index finger of a standard user.

A second lower corner portion 216 of the lower housing 210 located below the second front end face 215a has a recess along its entire height. The second lower corner portion 216 is a corner portion of the lower housing 210 which is located on the near side and on a side corresponding to the other end of the pivotal axis C.

As mentioned above, the first side support portion 213 and the second side support portion 215 are provided at laterally opposite sides of the catch tray 211. A paper delivery opening portion 217 is provided between the first side support portion 213 and the second side support portion 215. The paper delivery opening portion 217 opens toward the near side at the near end of the catch tray 211.

The second lower corner portion 216 has an auxiliary display portion 218, which serves as the display portion of the present invention. In the present embodiment, the auxiliary display portion 218 is provided at an upper end portion of the second lower corner portion 216.

The auxiliary display portion 218 in the present embodiment includes a light guide member exposed to the exterior of the lower housing 210, and a plurality of light emitting diodes of different colors which face the light guide member. The plurality of light emitting diodes (not shown) are provided in the interior of the lower housing 210. The auxiliary display portion 218 can provide indications corresponding to conditions of the printer section 2 and the image scanner section 3 by means of lighting of the light emitting diodes.

<<Feeder Unit>>

Referring to FIGS. 1 and 2, a feeder unit 220 is disposed at a lower portion of the lower housing 210. The feeder unit 220 can feed recording media into the lower housing 210. The feeder unit 220 can be attached to/detached from the lower housing 210 from the near side.

Referring to FIG. 2, a feeder case 221 is a member which forms the housing of the feeder unit 220 and which has a box-like shape opening upward. The feeder case 221 can accommodate a stack of recording media of up to A4 size with the longitudinal direction of the recording media coinciding with the front-rear direction of the printer section 2.

<<Printer Cartridge>>

Referring to FIG. 2, a printer cartridge 230 is accommodated within the lower housing 210 and is located above the feeder unit 220.

The printer cartridge 230 in the present embodiment includes a photoconductor drum 231, a developing unit 232, and a transfer roller 233.

The photoconductor drum 231 is a substantially cylindrical member and includes a metal pipe of aluminum or the like and a photoconductor layer, which is formed on the metal pipe and serves as an outer circumferential portion of the photoconductor drum 231. The photoconductor drum 231 is disposed in parallel with the width direction of the multifunction printer 1. An electrostatic latent image can be formed on the outer circumferential surface of the photoconductor drum 231.

The developing unit 232 is disposed in such a manner as to face the outer circumferential surface of the photoconductor drum 231. The developing unit 232 can feed a charged dry developing agent (toner) to the outer circumferential surface of the photoconductor drum 231 on which an electrostatic latent image is formed, whereby the dry developing agent can adhere to the outer circumferential surface in a pattern corresponding to an electrostatic latent image. In this manner, the developing unit 232 can develop an electrostatic latent image on the outer circumferential surface of the photoconductor drum 231.

The transfer roller 233 is disposed so as to face a portion of the outer circumferential surface of the photoconductor drum 231 which has passed a position where the developing unit 232 faces the photoconductor drum 231. The transfer roller 233 can cause transfer, to a recording medium, of the dry developing agent adhering to the outer circumferential surface of the photoconductor drum 231.

<<Exposure Unit>>

In the interior of the lower housing 210, an exposure unit 240 is disposed above the printer cartridge 230. The exposure unit 240 can irradiate the outer circumferential surface of the photoconductor drum 231 with a laser beam which is modulated according to image data, whereby an electrostatic latent image can be formed on the outer circumferential surface.

<<Fixation Section and Paper Ejection Section>>

In the interior of the lower housing 210, a fixation unit 250 is disposed downstream, with respect to a recording-medium transport direction, of a position where the photoconductor drum 231 and the transfer roller 233 face each other. The fixation unit 250 is disposed immediately under the back end of the catch tray 211.

The fixation unit 250 can apply pressure and heat to a recording medium which comes from the printer cartridge 230 and to which the dry developing agent adheres, whereby an image which is formed in the dry developing agent on the recording medium can be fixed on the recording medium.

Specifically, the fixation unit 250 includes a heat roller 251 and a press roller 252.

The heat roller 251 is configured such that a halogen lamp is accommodated within a metal cylinder, and is rotatably driven by a motor (not illustrated). The press roller 252 is formed from silicone rubber and can rotate as a follower roller of the heat roller 251 while being pressed against the heat roller 251 under a predetermined pressure.

Paired paper ejection rollers 261 are disposed at the position of the paper ejection port 212. The paired paper ejection rollers 261 can eject, toward the catch tray 211, a recording medium coming from the fixation unit 250.

<Image Scanner Section>

Figure 3:
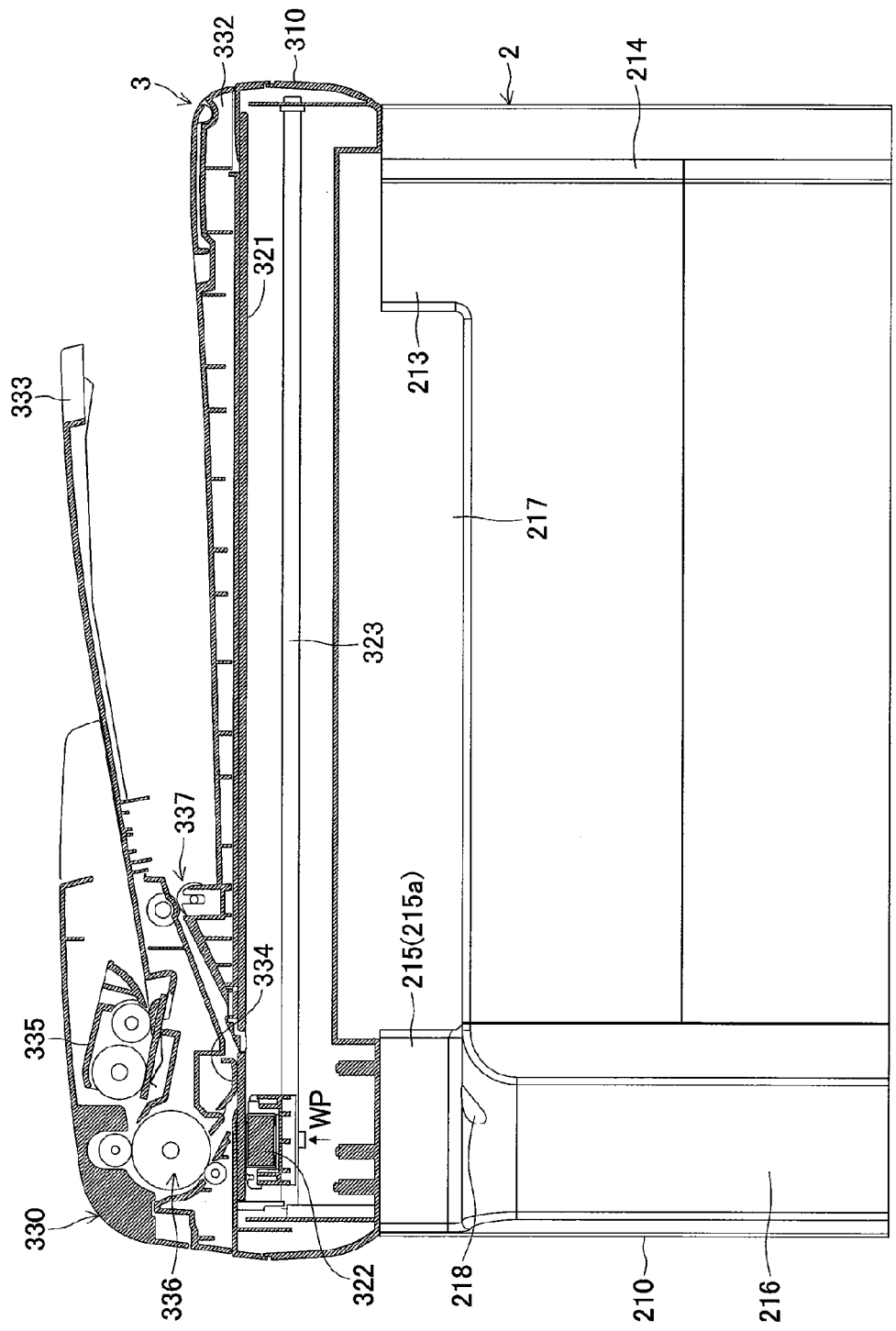
FIG. 3 is a front sectional view of the image scanner section shown in FIG. 1.

FIG. 3 is a sectional view of the image scanner section 3 of FIG. 1 as viewed from the front.

Referring to FIGS. 1 to 3, the image scanner section 3 has the above-mentioned upper housing 310. The upper housing 310 is a member for forming the housing of the image scanner section 3. The upper housing 310 is formed from a synthetic resin plate and assumes a box-like form having a substantially rectangular shape as viewed from above.

Referring to FIGS. 1 and 2, the upper housing 310 is disposed above the printer section 2 in such a manner as to cover the catch tray 211 from above. The upper housing 310 is supported by the lower housing 210 in such a manner as to be pivotable about the pivotal axis C located in the vicinity of an edge of the lower housing 210 resembling a rectangular parallelepiped.

A near end portion (a free end portion; i.e., an end portion apart from the pivotal axis C) of the upper housing 310 serves as a front operation section 311. The front operation section 311 has numbers of switches 312 and a main display 313.

The switches 312 are push-button switches for activating various operations, such as starting copying, selecting number of copies, setting fax destination, and starting fax. The main display 313 is a liquid crystal display and can display conditions of the printer section 2 and the image scanner section 3 by letters and the like.

Referring to FIG. 1, a first upper corner portion 314 in the front operation section 311 is supported from underneath by the first side support portion 213 of the lower housing 210. The first upper corner portion 314 is provided continuously with the first front end face 213a of the first side support portion 213, and the first lower corner portion 214.

The first upper corner portion 314 is an end portion of the front operation section 311 which is corresponding to one end of the pivotal axis C. That is, the first upper corner portion 314 is a corner portion of the upper housing 310 which is located on the free-end side of the upper housing 310 apart from the pivotal axis C. The first upper corner portion 314 is provided just above the first lower corner portion 214. The first upper corner portion 314 and the first lower corner portion 214 have substantially the same shape as viewed from above.

A second upper corner portion 315 in the front operation section 311 is provided in such a manner as to project beyond the second front end face 215a of the second side support portion 215, and the second lower corner portion 216.

The second upper corner portion 315 is an end portion of the front operation section 311 which is corresponding to the other end of the pivotal axis C. That is, the second upper corner portion 315 is a corner portion of the upper housing 310 which is located on the free-end side of the upper housing 310 apart from the pivotal axis C.

The second upper corner portion 315 is located just above the second lower corner portion 216. The second upper corner portion 315 differs in shape from the second lower corner portion 216 as viewed from above. That is, the second upper corner portion 315 and the second lower corner portion 216 define an overhang such that the second upper corner portion 315 projects beyond the second lower corner portion 216.

<<Detailed Configuration for Reading Documents>>

Referring to FIGS. 2 and 3, a document bed 321 is provided at an upper portion of the upper housing 310. The document bed 321 is a plate-like member having a rectangular shape as viewed from above and having a size corresponding to a sheet of recording medium of A4 size and is formed from a transparent material (glass or a synthetic resin). The document bed 321 is disposed such that its longitudinal direction is in parallel with the width direction of the multifunction printer 1.

A contact image scanner (CIS) 322, which serves as the image pickup unit of the present invention, is disposed within the upper housing 310. The CIS 322 is located under and in the vicinity of the document bed 321. The CIS 322 can output a signal according to the gray scale of an image on a document which is closely placed on the document bed 321.

The CIS 322 has a longitudinal length corresponding to the width of A4 paper (210 mm). The CIS 322 is disposed such that its longitudinal direction is perpendicular to the pivotal axis C.

In the present embodiment, image scanner section 3 is configured such that the CIS 322 can move in a reciprocating manner along the width direction of the multifunction printer 1 (along the left-right direction in FIG. 3). That is, the image scanner section 3 of the present embodiment is configured such that the CIS 322 can move in a reciprocating manner along the pivotal axis C.

As shown in FIG. 3, when a document read operation is not performed, the CIS 322 is positioned at the predetermined waiting position WP, which corresponds to the base position of the present invention. The waiting position WP is located virtually just above the second lower corner portion 216. That is, the CIS 322 can read a document placed on the document bed 321 while moving from the second lower corner portion 216 toward the first lower corner portion 214 (rightward in FIG. 3).

A CIS movement guide 323 is disposed within the upper housing 310. The CIS movement guide 323 is a rod-like member disposed such that its longitudinal direction is in parallel with the width direction of the multifunction printer 1. The CIS movement guide 323 can guide the reciprocating movement of the CIS 322 along the pivotal axis C.

An auto document feeder (ADF) 330 is disposed above the upper housing 310. Referring to FIG. 2, the ADF 330 is pivotable about a hinge portion 331. In the present embodiment, the image scanner section 3 is configured such that a pivotal axis which the hinge portion 331 provides for pivotal movement of the ADF 330 is in parallel with the pivotal axis C.

Specifically, the ADF 330 can pivot between a closed state and an open state. In the closed state, the ADF 330 rests on the document bed 321, thereby pressing a document against the document bed 321. In the opened state, the ADF 330 is pivotally opened to an angle of about 45° with respect to a horizontal plane, so that the user can place a document on or remove a document from the document bed 321.

The ADF 330 has a lower document tray 332, an upper document tray 333, a document-pressing-down pad 334, a document feed mechanism 335, a document transport mechanism 336, and a document ejection mechanism 337.

The lower document tray 332 can press a document placed on the document bed 321 and can receive documents ejected from the ADF 330. The upper document tray 333 allows placement thereon of documents to be read by the CIS 322.

Figure 4:
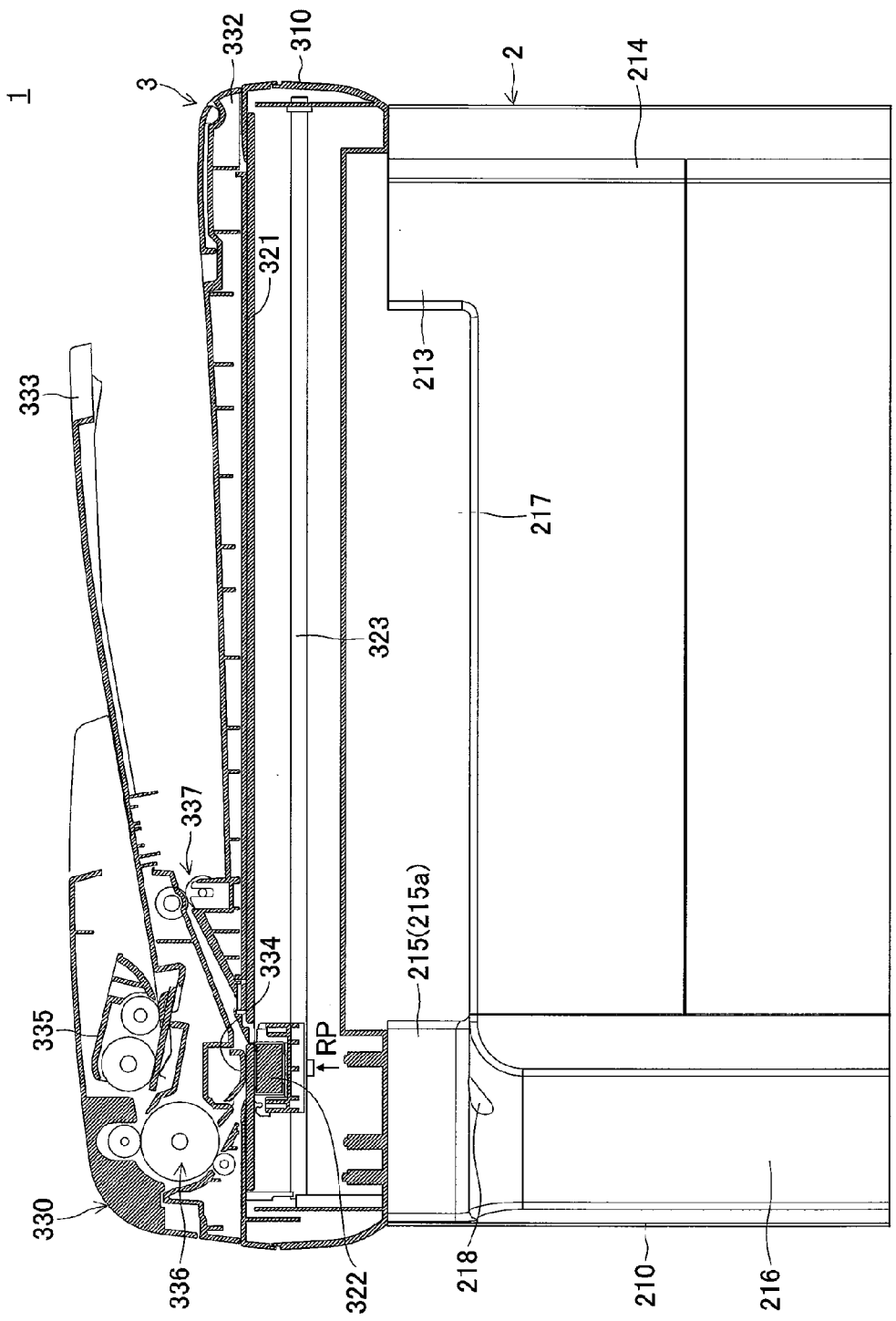
FIG. 4 is a front sectional view of the image scanner section, showing a state in which a contact image scanner (CIS) shown in FIG. 3 has moved from a waiting position to a read position which is slightly offset from the waiting position toward a first lower corner portion.

FIG. 4 is a sectional view of the image scanner section 3, as viewed from the front, in a state in which the CIS 322 shown in FIG. 3 has moved from the waiting position WP to a read position RP which is slightly offset from the waiting position WP toward the first lower corner portion 214.

As shown in FIG. 4, the document-pressing-down pad 334 is located at such a position as to face the CIS 322 which is positioned at the read position RP. The document-pressing-down pad 334 can press down a document against the document bed 321 at a position located just above the CIS 322 which is positioned at the read position RP.

The document feed mechanism 335 can feed documents placed on the upper document tray 333 one by one toward the inner part of the ADF 330. The document feed mechanism 335 has at least one rubber roller.

The document transport mechanism 336 can transport a document received from the document feed mechanism 335 toward a position between the document-pressing-down pad 334 and the document bed 321. The document transport mechanism 336 has at least rubber rollers whose length correspond to the width of A4 paper (210 mm).

The document ejection mechanism 337 can eject, toward the lower document tray 332, a document which the CIS 322 has read at the position between the document-pressing-down pad 334 and the document bed 321. The document ejection mechanism 337 includes a pair of roller members.

<Outline of Operations>

The outline of operations of the multifunction printer 1 having the above-described configuration will next be described with reference to the drawings.

<<Document Read Operation>>

As shown in FIG. 3, before a document read operation is initiated, the CIS 322 is positioned at the waiting position WP.

(1) In this condition, the ADF 330 is opened through pivotal movement about the hinge portion 331. A document is placed on the document bed 321 such that a side which bears an image to be read is in close contact with the document bed 321. Subsequently, the ADF 330 is closed. This causes the document to be pressed against the document bed 321.

Subsequently, when a predetermined switch operation is performed, the CIS 322 moves to the read position RP shown in FIG. 4 and then moves, from the read position RP, rightward in FIG. 4. In the course of this rightward movement, the CIS 322 reads the document. Upon completion of reading, the CIS 322 moves back to the waiting position WP shown in FIG. 3.

(2) In a state in which no document is placed on the document bed 321, and one or more documents are placed on the upper document tray 333, a predetermined switch operation is performed.

Then, the CIS 322 moves to the read position RP shown in FIG. 4. Next, the document feed mechanism 335 feeds documents one by one toward the inner part of the ADF 330. The document transport mechanism 336 transports a document received from the document feed mechanism 335 toward a position between the document-pressing-down pad 334 and the document bed 321 (CIS 322). At this position, the CIS 322 reads the document. The document which has passed the position is ejected toward the lower document tray 332 by the document ejection mechanism 337. Upon completion of reading of the documents, the CIS 322 moves back to the waiting position WP shown in FIG. 3.

<<Image-Forming Operation>>

On the basis of image data read by the CIS 322 or image data received from an external device (a personal computer, a telephone line, an external recording medium, etc.), an image is formed on a sheet of recording medium in the following manner.

Referring to FIG. 2, the feeder unit 220 feeds a recording medium contained in the feeder case 221 toward a position where the photoconductor drum 231 and the transfer roller 233 face each other.

The exposure unit 240 irradiates the outer circumferential surface of the photoconductor drum 231 with a laser beam which is modulated according to image data. By this procedure, an electrostatic latent image is formed on the outer circumferential surface of the photoconductor drum 231. This electrostatic latent image is developed by the developing unit 232. That is, a charged developing agent adheres in a pattern of image to the outer circumferential surface of the photoconductor drum 231.

The developing agent adhering to the outer circumferential surface of the photoconductor drum 231 is transferred onto the recording medium at a position where the photoconductor drum 231 and the transfer roller 233 face each other. The recording medium which bears the transferred developing agent is subjected to heat and pressure applied by the fixation unit 250. By this procedure, the developing agent is fixed on the recording medium.

The recording medium which comes from the fixation unit 250 and on which the developing agent is fixed is ejected through the paper ejection port 212 toward the catch tray 211 by the paired paper ejection rollers 261. By this procedure, the recording medium on which an image is formed is placed on the catch tray 211.

<<Viewing Inside of Catch Tray and Taking Out Recording Media>>

Figure 5:
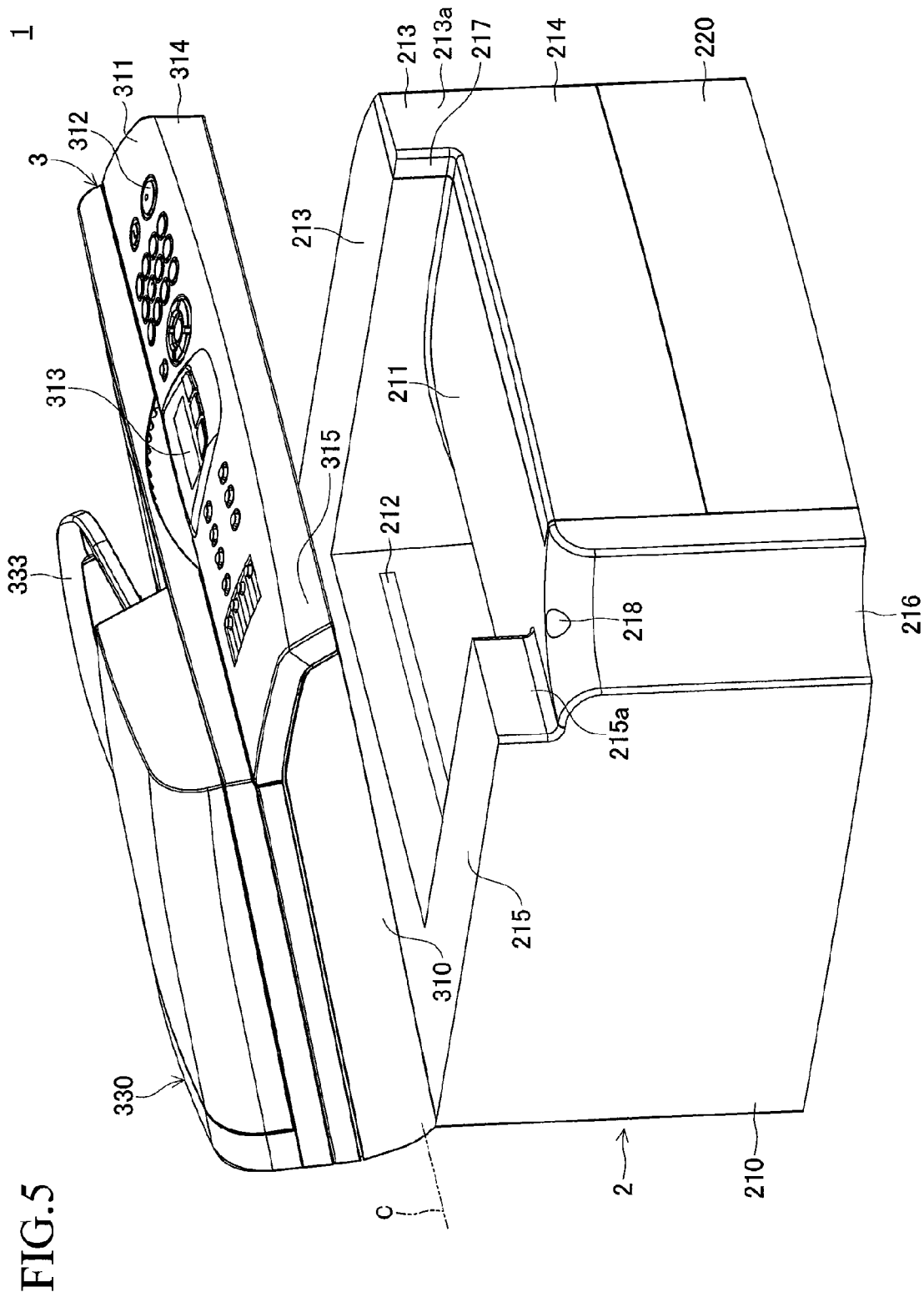
FIG. 5 is a perspective view of the multifunction printer shown in FIG. 1, showing a state in which the image scanner section is opened upward.
Figure 6:
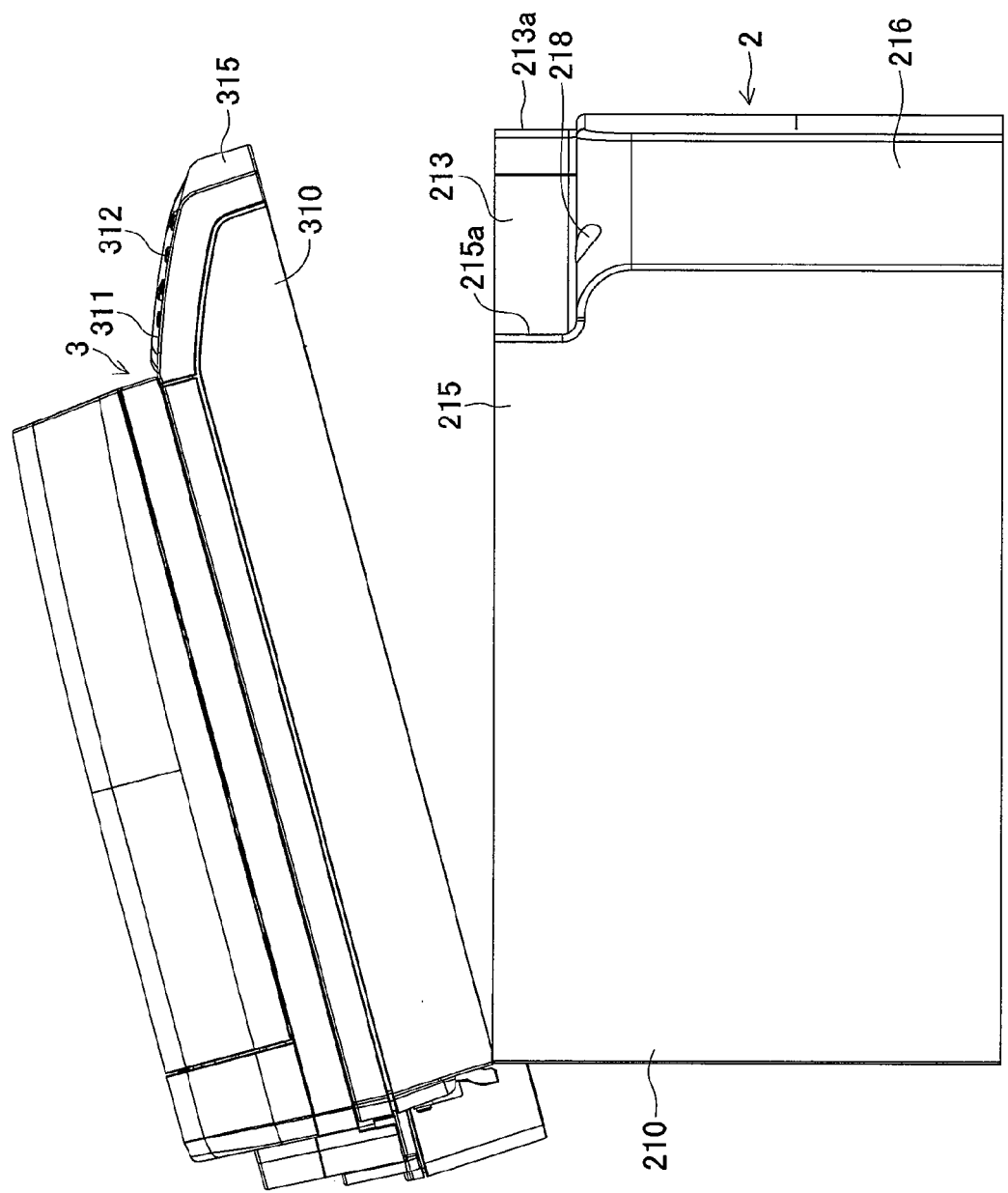
FIG. 6 is a left side view of the multifunction printer shown in FIG. 5.

FIG. 5 is a perspective view of the multifunction printer 1 of FIG. 1 in a state in which the image scanner section 3 is opened upward. FIG. 6 shows the multifunction printer 1 of FIG. 5 as viewed from the left side.

As shown in FIGS. 5 and 6, when the second upper corner portion 315 in the image scanner section 3 shown in FIG. 1 is lifted upward, the image scanner section 3 is opened upward. Thus, as shown in FIG. 5, the catch tray 211 is widely opened toward the exterior of the multifunction printer 1.

In this condition, the inside of the catch tray 211 can be readily viewed. Also, recording media of a small size (e.g., the postcard size) placed on the catch tray 211 can be readily taken out.

<Effect of Configuration of Present Embodiment>

The effect of the configuration of the present embodiment will next be described with reference to the drawings.

Referring to FIG. 1, in the present embodiment, a near end portion of the first side support portion 213 is located just under the first upper corner portion 314. A near end portion of the second side support portion 215 is offset from the second lower corner portion 216 such that the second upper corner portion 315 projects beyond the near end portion of the second side support portion 215. The amount of offset is a minimum amount where a standard user can easily hook his/her hand onto the corner portion of the image scanner section 3.

That is, in the present embodiment, in a region between the second lower corner portion 216, and the second upper corner portion 315 projecting beyond the lower second corner portion 216, the near end face (the second front end face 215a) of the second side support portion 215 is indented toward the pivotal axis C.

This configuration allows the user to readily open/close the image scanner section 3 by hooking his/her hand onto the projecting second upper corner portion 315 and lifting the second upper corner portion 315 upward.

Accordingly, the image scanner section 3 can be readily opened/closed while being stably supported by the lower housing 210 in the printer section 2.

According to this configuration, on a side toward the second front end face 215a, the catch tray 211 is opened obliquely frontward. This improves visibility of the interior of the catch tray 211.

Referring to FIG. 1, in the present embodiment, the upper housing 310 and the lower housing 210 are configured such that the second upper corner portion 315 and the second lower corner portion 216 differ in shape so as to allow the second upper corner portion 315 to project beyond the second lower corner portion 216. That is, in the present embodiment, the second upper corner portion 315 and the second lower corner portion 216 define an overhang such that the second upper corner portion 315 projects beyond the second lower corner portion 216.

Accordingly, when the user moves his/her fingers upward along the second lower corner portion 216, the fingers can be smoothly guided to the overhang. The fingers are hooked onto the second upper corner portion 315 projecting beyond the second lower corner portion 216 and lift the second upper corner portion 315 upward.

According to this configuration, even though the paper delivery opening portion 217 is not formed along the entire width of the multifunction printer 1, the image scanner section 3 can be opened/closed more readily.

Referring to FIG. 1, in the present embodiment, the second lower corner portion 216 differs in shape from the second upper corner portion 315 along the entire height of the second lower corner portion 216. Specifically, in the present embodiment, the second lower corner portion 216 has a recess along its entire height.

By virtue of this configuration, when the user moves his/her fingers upward along the recess, the fingers can be smoothly guided to the overhang.

This configuration facilitates, to a greater extent, an operation of opening/closing the image scanner section 3.

Referring to FIGS. 1 and 3, in the present embodiment, the CIS 322 positioned at the waiting position WP and the major structure (the document feed mechanism 335, the document transport mechanism 336, etc.) of the ADF 330 are located toward the second upper corner portion 315.

According to this configuration, when an image-reading operation is not performed, an operation of opening/closing the image scanner section 3 is performed. At this time, the hand of the user lifts a portion of the image scanner section 3 in the vicinity of which the CIS 322, which has a relatively heavy weight, is positioned.

Thus, in the course of opening/closing the image scanner section 3, twisting of the image scanner section 3 (the upper housing 310) can be effectively restrained. Therefore, the image scanner section 3 can be opened/closed more favorably.

Referring to FIG. 2, in the present embodiment, the paper ejection port 212 is located toward the pivotal axis C. This can minimize the area of the printer section 2 projected on a plane, as well as the area of the multifunction printer 1 projected on a plane.

Referring to FIG. 1, in the present embodiment, an auxiliary display portion 218 is provided on the second lower corner portion 216. This can improve visibility of various indications corresponding to operating conditions of the multifunction printer 1.

<Modifications>

The above-described embodiment is a mere example of the best mode which the applicant of the present invention contemplated at the time of filing the present application. The present invention is not limited to the above-described embodiment. Various modifications to the above-described embodiment are possible, so long as the invention is not modified in essence.

Modifications to the above-described embodiment will next be exemplified. In the following description of the modifications, members similar in structure and function to those used in the above-described embodiment are denoted by the same reference numerals as those used in the above-described embodiment. As for the description of these members, an associated description appearing in the description of the above-described embodiment can be cited so long as no technical inconsistencies are involved.

Needless to say, modifications are not limited to those exemplified below. Also, a plurality of modifications can be combined as appropriate, so long as no technical inconsistencies are involved.

The above-described embodiment and the following modifications should not be construed as limiting the present invention (particularly, those components which partially compose means for solving the problems to be solved by the invention and are illustrated with respect to operations and functions). Such limiting construal unfairly impairs the interests of an applicant (who is motivated to file as quickly as possible under the first-to-file system) while unfairly benefiting imitators, and is thus impermissible.

(a) An application of the present invention is not limited to a multifunction printer. The present invention may be favorably applied to, for example, an image-forming apparatus having only a copying function or an image-forming apparatus having only a faxing function.

(b) The printer section 2 (printer cartridge 230) is not limited to an electrophotographic type as in the case of the above-described embodiment. For example, a so-called ink jet type may be employed.

(c) In the above-described embodiment, the waiting position WP differs from the read position RP. The present invention is not limited thereto. The waiting position WP and the read position RP may be the same position.

(d) In the above-described embodiment, the image scanner section 3 has both an ADF function and a flat bed scanner function. However, the present invention is not limited thereto.

Specifically, the image scanner section 3 may have only the flatbed scanner function without having the ADF function. Alternatively, the image scanner section 3 may have only the ADF function without having the flatbed scanner function.

(e) In terms of the effect of the above-mentioned structural feature (e.g., recess) of the second lower corner portion 216, imparting the structural feature to at least an upper end portion of the second lower corner portion 216 will suffice.

Figure 7:
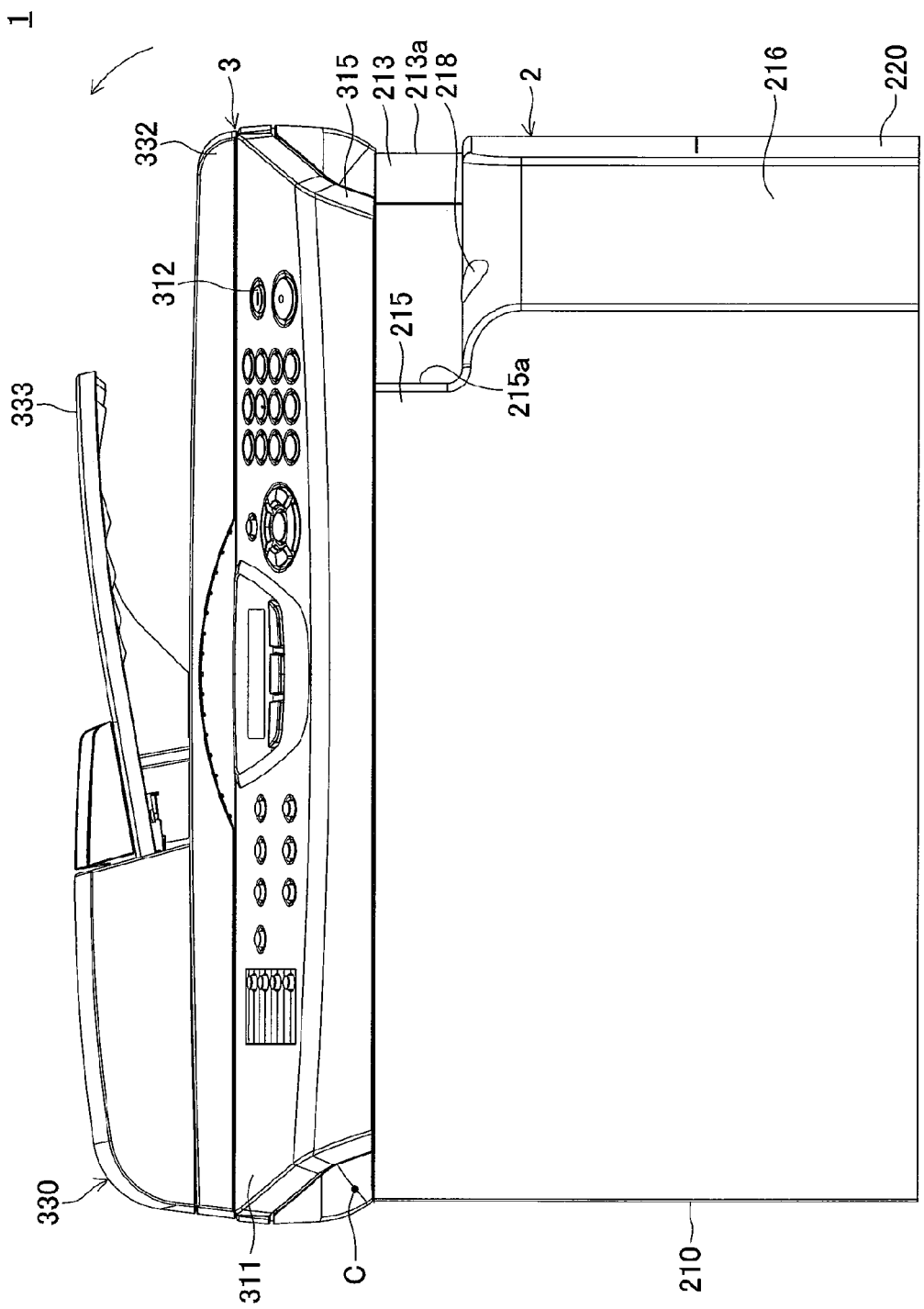
FIG. 7 is a left side view showing a modified configuration of the multifunction printer shown in FIG. 6.
Figure 8:
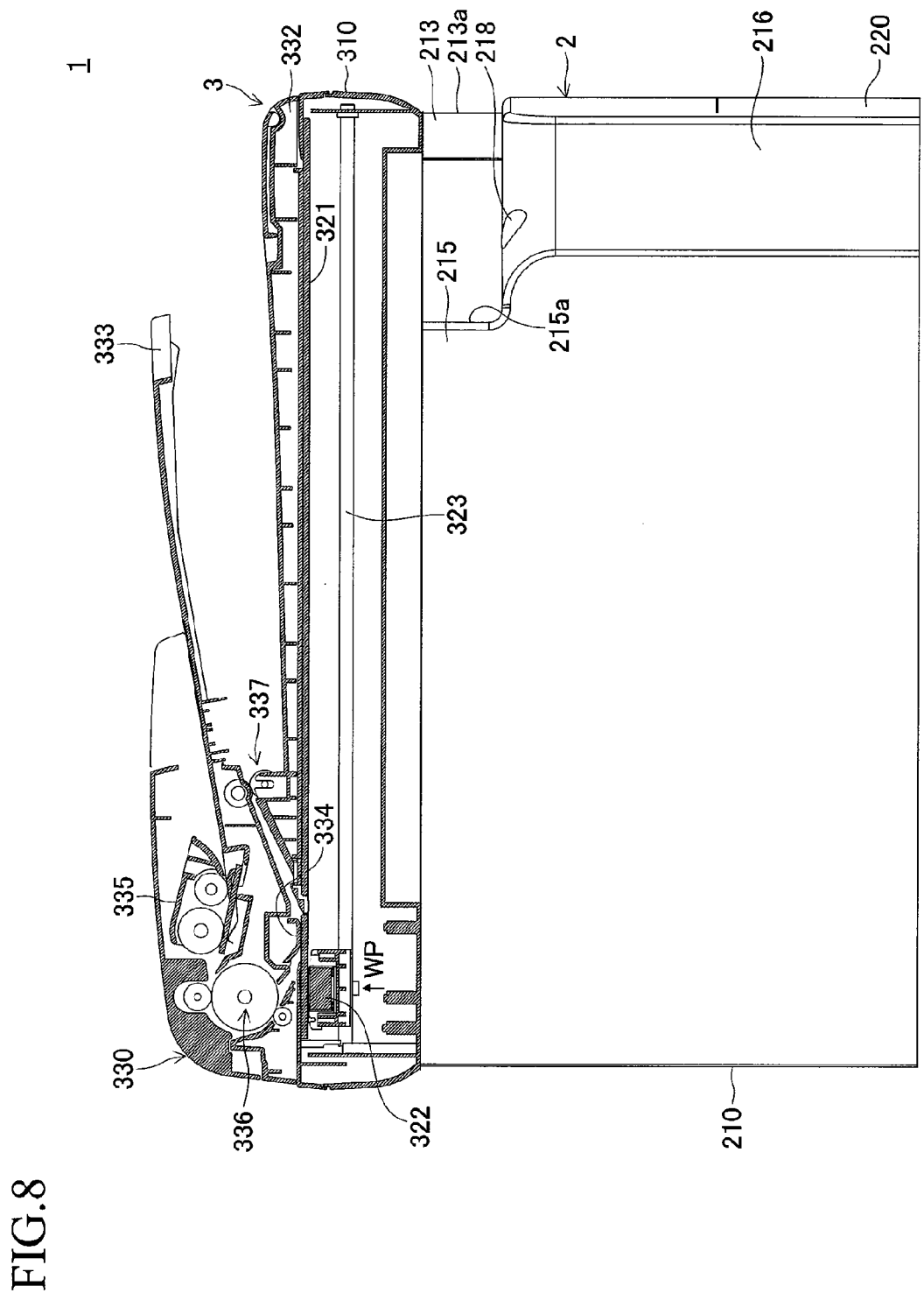
FIG. 8 is a sectional view of an image scanner section shown in FIG. 7.

(f) FIG. 7 shows a modified configuration of the multifunction printer 1 shown in FIG. 6. FIG. 8 is a sectional view of the image scanner section 3 shown in FIG. 7.

Referring to FIGS. 7 and 8, the pivotal axis C in the present modification is in parallel with the longitudinal direction of the CIS 322. In the present modification, the second upper corner portion 315 projecting beyond the second lower corner portion 216 positionally corresponds to an end portion of the CIS movement guide 323 opposite the waiting position WP.

According to this configuration, the CIS 322 reads an image read through movement toward the free-end side (associated with the second upper corner portion 315) of the image scanner section 3.

When an image-reading operation is not performed, the CIS 322 is positioned at the waiting position WP. In this condition, the image scanner section 3 is opened/closed. At this time, a portion of the image scanner section 3 where the CIS 322, which has a relatively heavy weight, is positioned is located toward the pivotal axis C. Therefore, the user can lift the second upper corner portion 315 with a small force.

Thus, the image scanner section 3 can be opened/closed more favorably.

(g) Those components which partially compose means for solving the problems to be solved by the invention and are illustrated with respect to operations and functions encompass not only the specific structures disclosed above in the description of the above embodiment and modifications, but also any other structures that can implement the operations and functions.

What is claimed is:

1. An image-forming apparatus comprising:
   a lower housing having a box-like shape and having a sheet ejection port and a catch tray formed at an upper portion thereof, and
   an upper housing having a box-like shape and disposed above the lower housing in such a manner as to cover the catch tray from above, the upper housing is coupled to the lower housing in such a manner as to be pivotable about a pivotal axis located closer to an edge of the lower housing than the upper housing;
   wherein the lower housing comprises:
   a first side support portion located on a side of the lower housing corresponding to one end of the pivotal axis in such a manner as to support the upper housing from underneath and having a first distal end to the pivotal axis, and
   a second side support portion located on a side of the lower housing corresponding to the other end of the pivotal axis in such a manner as to support the upper housing from underneath and having a second distal end to the pivotal axis, wherein the second distal end is nearer to the pivotal axis than the first distal end in such a manner that a corner portion of the upper housing projects beyond the second distal end.

2. An image-forming apparatus according to claim 1, wherein a front operation section having a switch and a display is formed on the upper housing at a distal end to the pivotal axis.

3. An image-forming apparatus according to claim 2, wherein an end portion along the pivotal axis of the front operation section projects beyond the second distal end.

4. An image-forming apparatus according to claim 1, wherein the first distal end of the lower housing and a distal end of the upper housing located just above the first distal end are located around the same position with respect to a side view when the upper housing is closed.

5. An image-forming apparatus according to claim 1, wherein the sheet ejection port is disposed along the edge of the lower housing in such a manner that a sheet is ejected along a direction across the pivotal axis.

6. An image-forming apparatus according to claim 1, wherein the upper housing includes an image-reading section configured to read a document image, and the lower housing includes an image-forming section configured to form an image on a sheet and eject the sheet through the sheet ejection port to the catch tray.

* * * * *